United States Patent
Li et al.

(10) Patent No.: US 12,124,360 B2
(45) Date of Patent: Oct. 22, 2024

(54) SETTING METHOD OF IN-MEMORY COMPUTING SIMULATOR

(71) Applicants: Inventec (Pudong) Technology Corporation, Shanghai (CN); INVENTEC CORPORATION, Taipei (TW)

(72) Inventors: Ke-Han Li, Taipei (TW); Chih-Fan Hsu, Taipei (TW); Yu-Sheng Lin, Taipei (TW); Wei-Chao Chen, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 71 days.

(21) Appl. No.: 17/990,801

(22) Filed: Nov. 21, 2022

(65) Prior Publication Data
US 2024/0078170 A1    Mar. 7, 2024

(30) Foreign Application Priority Data
Aug. 29, 2022 (CN) .......................... 202211048663.1

(51) Int. Cl.
   *G06F 11/36*      (2006.01)
   *G06N 3/045*     (2023.01)

(52) U.S. Cl.
   CPC ...... *G06F 11/3688* (2013.01); *G06F 11/3684* (2013.01); *G06N 3/045* (2023.01)

(58) Field of Classification Search
   CPC .. G06F 11/3688; G06F 11/3684; G06N 3/045
   USPC .................. 717/124–141; 706/25–24, 25–45
   See application file for complete search history.

(56) References Cited

U.S. PATENT DOCUMENTS

| | | | | |
|---|---|---|---|---|
| 7,065,513 B1* | 6/2006 | Bertrand | .................. | G09B 7/00 434/362 |
| 7,613,572 B2* | 11/2009 | Ben-Gal | ........... | G06F 18/24323 702/19 |
| 8,374,980 B2* | 2/2013 | Wit | .......................... | G09B 7/00 706/45 |
| 8,374,981 B2* | 2/2013 | Shigemori | ............. | G06Q 10/04 706/45 |

(Continued)

OTHER PUBLICATIONS

Zahedi et al,"MNEMOSENE: Tile Architecture and Simulator for Memristor-based Computation-in-memory", ACM, pp. 1-24 (Year: 2022).*

(Continued)

*Primary Examiner* — Anil Khatri
(74) *Attorney, Agent, or Firm* — Locke Lord LLP; Tim Tingkang Xia, Esq.

(57) ABSTRACT

A setting method of in-memory computing simulator is presented. It involves an in-memory computing device performing various test combinations of neural network models and datasets, recording the corresponding first estimation indices. A processing device then uses these test combinations to execute a simulator with adjustable settings and records the corresponding second estimation indices. The processing device calculates a correlation sum according to the first estimation indices and second estimation indices, and performs an optimal algorithm to search an optimal parameter in a setting space to maximize the correlation sum.

8 Claims, 12 Drawing Sheets

(56) References Cited

U.S. PATENT DOCUMENTS

| | | | |
|---|---|---|---|
| 9,717,449 B2* | 8/2017 | Kamath | A61B 5/14532 |
| 9,836,701 B2* | 12/2017 | Chen | G06N 20/20 |
| 10,614,370 B2* | 4/2020 | Johnson | G06N 10/00 |
| 11,017,322 B1* | 5/2021 | Du | G06N 20/00 |
| 11,562,386 B2* | 1/2023 | Saarenvirta | G06Q 30/0204 |
| 11,586,960 B2* | 2/2023 | Harris | G06N 5/022 |
| 11,681,953 B2* | 6/2023 | Drake | G16H 50/70 |
| | | | 705/3 |
| 11,748,625 B2* | 9/2023 | Korthikanti | G06N 3/063 |
| | | | 706/25 |
| 11,776,608 B2* | 10/2023 | Li | G11C 11/54 |
| | | | 706/41 |
| 11,900,239 B2* | 2/2024 | Gu | G06N 3/04 |
| 11,934,440 B2* | 3/2024 | Maucec | G06F 16/355 |
| 12,051,005 B2* | 7/2024 | Ronagh | G06F 9/45504 |
| 12,056,613 B2* | 8/2024 | Gesmundo | G06N 3/082 |

OTHER PUBLICATIONS

Zhan et al, "A Unified Memory Network Architecture for In-Memory Computing in Commodity Servers", IEEE, pp. 1-14 (Year: 2016).*

Wei et al, "A data compressor for FPGA-based state vector quantum simulators", ACM, pp. 63-70 (Year: 2024).*

Mills et al, "Determining Relative Importance and Effective Settings for Genetic Algorithm Control Parameters", ACM, pp. 309-342 (Year: 2014).*

Ankit et al, "Circuits and Architectures for In-Memory Computing-Based Machine Learning", IEEE, pp. 1-15 (Year: 2020).*

Roy et al, "In-Memory Computing in Emerging Memory Technologies for Machine Learning: An Overview", IEEE, pp. 1-6 (Year: 2020).*

* cited by examiner

SETTING METHOD OF IN-MEMORY COMPUTING SIMULATOR

CROSS-REFERENCE TO RELATED APPLICATIONS

This non-provisional application claims priority under 35 U.S.C. § 119(a) on Patent Application No(s). 202211048663.1 filed in China on Aug. 29, 2022, the entire contents of which are hereby incorporated by reference.

BACKGROUND

1. Technical Field

The present disclosure relates to artificial intelligence, and more particularly to a setting method of in-memory computing simulator.

2. Related Art

Machine learning (ML) technologies usually move and access data between processors and storage devices, such as memory, during training and inference. Therefore, in-Memory Computing (IMC) provides an opportunity to reduce the cost of energy consumption and computational delay generated from moving and accessing data in (or from) memory, and thereby accelerating the output efficiency of ML technologies.

Therefore, understanding the input-output behavior of an IMC hardware is the start of utilizing the hardware to meet commercial demands. In this case, a sophisticated IMC hardware simulator is required to explore the IMC hardware behavior. However, simulating the behavior of an IMC hardware is difficult because the behavior highly depends on the used materials and implementations. Therefore, the hardware users should wait for the simulator released by the hardware developers before utilizing it. In addition, simulators provided by different developers usually have different settings. Therefore, users cannot easily use the simulator provided by developer A to simulate the IMC hardware provided by developer B.

SUMMARY

Accordingly, the present disclosure proposes a setting method of in-memory computing simulator so that users may tune existing IMC simulators to any IMC hardware, manufacturers may save the cost of developing new hardware simulators and users may save their time waiting for new simulators.

According to an embodiment of the present disclosure, a setting method of in-memory computing simulator comprises: performing, by an in-memory computing device, a plurality of test combinations and recording a plurality of first estimation indices corresponding to the plurality of test combinations respectively, wherein each of the plurality of test combinations comprises one of a plurality of neural network models and one of a plurality of datasets; executing, by a processing device a simulator according to the plurality of test combinations, and recording, by the processing device, a plurality of second estimation indices corresponding to the plurality of test combinations respectively, wherein the simulator has a plurality of settings that are adjustable; calculating, by the processing device, a correlation sum according to the plurality of first estimation indices and the plurality of second estimation indices; and performing, by the processing device, an optimal algorithm to search an optimal parameter in a setting space constructed by the plurality of settings so that the correlation sum is maximal.

According to an embodiment of the present disclosure, a setting method of in-memory computing simulator comprises a plurality steps performed by a processor device, wherein the plurality of steps comprises: executing a first simulator according to a plurality of test combinations and recording a plurality of first estimation indices corresponding to the plurality of test combinations respectively, wherein each of the plurality of test combinations comprises one of a plurality of neural network models and one of a plurality of datasets; executing a second simulator according to the plurality of test combinations and recording a plurality of second estimation indices corresponding to the plurality of test combinations respectively, wherein the second simulator has a plurality of settings that are adjustable; calculating a correlation sum according to the plurality of first estimation indices and the plurality of second estimation indices; and performing an optimal algorithm to search an optimal parameter in a setting space constructed by the plurality of settings so that the correlation sum is maximal.

In view of the above, the purpose of an embodiment of the present disclosure is to use an existing simulator to simulate any IMC hardware or an IMC simulator, so as to save time for developing a new simulator. An embodiment of the present disclosure converts the matching problem of hardware and simulator into an optimization problem of finding the best setting in the setting space. An embodiment of the present disclosure calculates the correlation of test accuracy for each class between the target hardware and a simulator with a setting, and demonstrates the effectiveness of an embodiment of the present disclosure through a number of experimental results. In an embodiment of the present disclosure, any existing optimization algorithm may be used in the step of finding the optimal parameter, which demonstrates the flexibility of an embodiment of the present disclosure in implementation.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The detailed description of the embodiments of the present disclosure includes a plurality of technical terms, and the following are the definitions of these technical terms:

In-memory computing (IMC): the technologies that computes data stored in random-access memory.

Random-access memory (RAM): a form of computer memory that can be read and changed in any order, which is the main memory in a computer.

Machine learning (ML): a field of study that gives computers the ability to learn without being explicitly programmed.

Optimization problem: the problem of finding the best solution from all feasible solutions. Loss functions, distance functions: the objective function of the optimizing process.

The objects of the present disclosure include: (1) using any existing IMC simulator to simulate any IMC hardware, and (2) using any existing IMC simulator to simulate another IMC simulator. For the former, when the IMC developers manufacture the hardware, the internal parameters used are usually not known to the outside world. However, the behavior of the IMC hardware can be simulated by a third-party simulator through the method proposed in the present disclosure. For the latter, it should be understood that IMC simulators produced by different IMC developers have multiple settings that are not identical. Therefore, the configuration of one IMC simulator cannot be applicable to another IMC simulator.

Figure 1A:
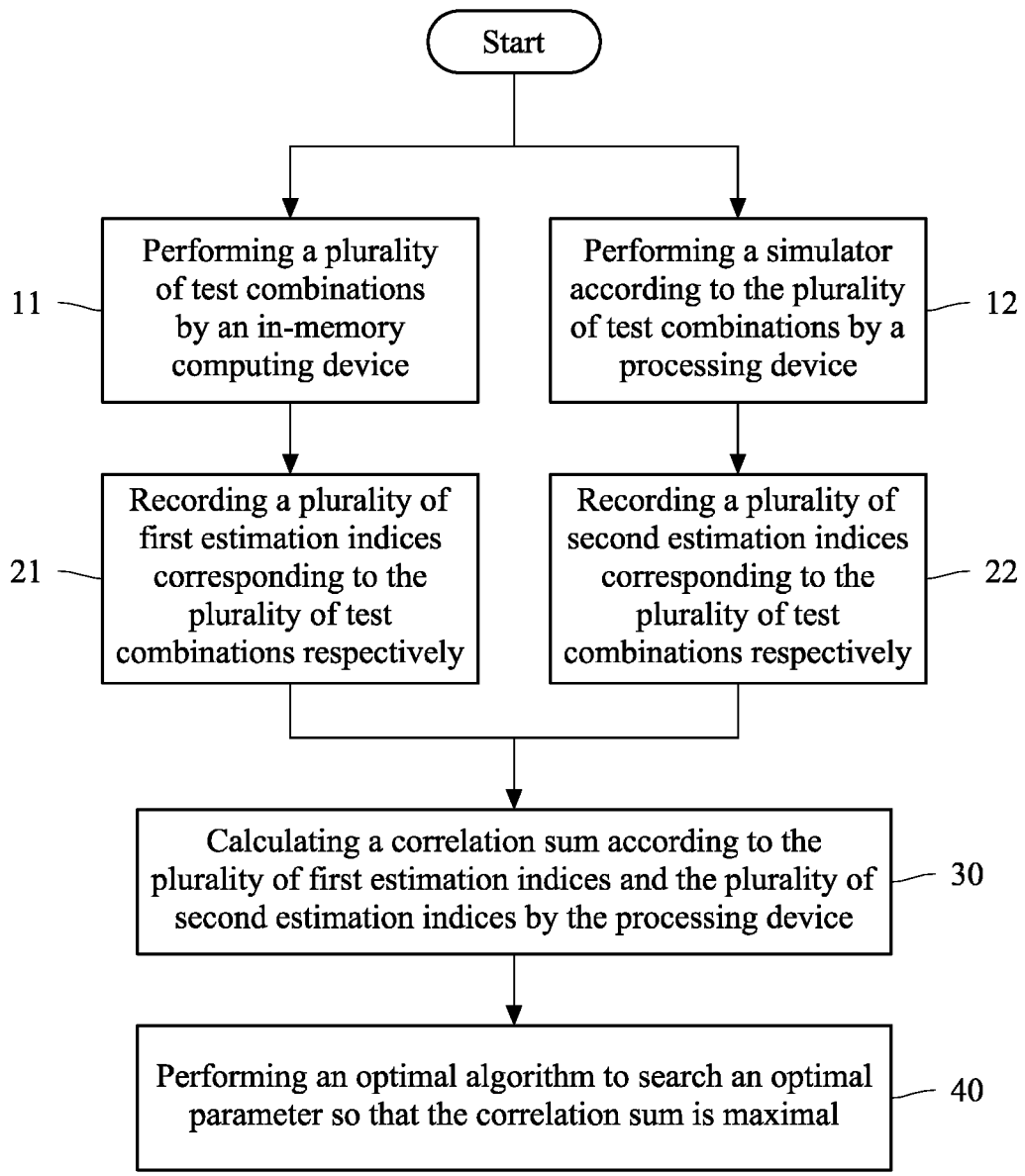
FIG. 1A is a flowchart of a setting method of in-memory computing simulator according to an embodiment of the present disclosure.

FIG. 1A is a flowchart of a setting method of in-memory computing simulator according to an embodiment of the present disclosure and includes steps 11 to 40. The embodiment of FIG. 1A is used to realize the first object of the present disclosure: simulating an IMC hardware with an IMC simulator.

In step 11, the IMC device performs a plurality of test combinations. The IMC device is a simulation target. In an embodiment, the IMC device is an actual hardware, such as a chip. The architecture of hardware may adopt ISAAC (Ali Shafiee et. al, ISAAC: A Convolutional Neural Network Accelerator with In-Situ Analog Arithmetic in Crossbars) or PRIME (Ping Chi, et. al, PRIME: A Novel Processing-in-memory Architecture for Neural Network Computation in ReRAM-based Main Memory). The above architecture are just examples, and the present disclosure does not limit the hardware architecture of IMC devices.

The plurality of test combinations consists of a plurality of neural network models and a plurality of datasets. In an embodiment, the plurality of neural network model may adopt a visual geometry group (VGG) such as VGG8 or VGG13. The present disclosure does not limit the kinds of the neural network models and hyper-parameters thereof. In an embodiment, the plurality of datasets may adopt CIFAR-10 (Canadian Institute for Advanced Research) and EMNIST (Extension of National Institute of Standards and Technology) letters. Each dataset has a plurality of classes. For example, CIFAR-10 includes 10 classes of color images, and EMNIST letters includes 26 classes of handwritten character digits. The present disclosure does limit the kinds of datasets and the number of classes.

The number of test combinations is the product of the number of neural network models and the number of datasets. For example, the neural network model includes M1, M2 and M3 and the dataset includes D1 and D2. In an embodiment of step 11, the in-memory computing device executes M1 according to D1, then executes M1 according to D2, then executes M2 according to D1, then executes M2 according to D2, then executes M3 according to D1, and finally executes M3 according to D2. The in-memory computing device executes (3×2) test combinations in total. The present disclosure does not limit the execution order of these test combinations.

In step 11, the in-memory computing device may be electrically connected to a processing device to control the input of the in-memory computing device and receive the output thereof through the processing device. The processing device may be, for example, a general computer or any electronic device capable of executing IMC simulators.

In step 12, the processing device executes the simulator according to the plurality of test combinations. The simulator has a plurality of settings that are adjustable. In an embodiment, the simulator is one of the following IMC simulators: NeuroSim, MemTorch, and Analog Hardware Acceleration Kit (aihwkit) proposed by International Business Machines Corporation (IBM®). However, simulators applicable of the present disclosure are not limited to the above example, any current IMC simulators or IMC simulators to be released in the future are applicable to the method proposed by an embodiment of the present disclosure. It should be noted that different simulators usually have different settings. For example, the settings of NeuroSim include retention time, drift coefficient, weight precision, and conductance variation; the settings of MemTorch include crossbar tile shape, and weight precision; the settings of aihwkit include time of inference, remap weight. Even if the settings of different simulators have the same name, the effect on the output of the device may be different. In addition, the number of settings may be one or more, and the following description will take multiple settings as an example.

In step 21, a plurality of first estimation indices corresponding to the test combinations are recorded by the processing device electrically connected to the in-memory computing device. In step 22, a plurality of second estimation indices are recorded by the processing device. The first estimation indices and the second estimation indices are used to reflect the performance of the neural network model in the test combinations. In an embodiment, the first estimation indices and the second estimation indices may adopt one of the followings: accuracy, precision, recall, and F1 score. However, the estimation index is not limited to the above example, and any parameter used to evaluate the performance of the neural network model should be regarded as an embodiment of the first estimation index and the second estimation index in the present disclosure.

In step 30, the processing device calculates a correlation sum according to the plurality of first estimation indices and the plurality of second estimation indices. In an embodiment, the correlation sum is a sum of a plurality of correlations, and each of the plurality of correlations is one of the followings: Pearson correlation coefficient, L1 loss function, L2 loss function, cosine similarity, and Euclidean distance. However, the calculation method of the correlations is not limited to the above examples, and any function used to calculate the similarity between the first estimation indices and the second estimation indices should be regarded as an embodiment of the correlation of the present disclosure.

In an embodiment of step 30, the processing device calculates the output of an objective function as the correlation sum. The present disclosure proposed this objective function based on this assumption: the outputs of the neural network running on two IMC devices (simulators) are similar if and only if the two IMC devices (simulators) are similar. Specifically, we expect the per-class accuracy should be similar, namely, $$F(H, S_\theta) = \sum\nolimits_{d=1}^{|D|} \sum\nolimits_{m=1}^{|M|} \rho_{A_H^{d,m} A_{S_\theta}^{d,m}},$$ (Equation 1)

where F(•) denotes the objective function, F(H, $S_\theta$) denotes the correlation sum, H denotes the in-memory computing device, S denotes the simulator, θ denotes a candidate of the setting space constructed by the plurality of settings, $S_\theta$ denotes the simulator set with the candidate, |D| denotes a number of the plurality of datasets, |M| denotes a number of the plurality of neural network models, $$\rho_{A_H^{d,m} A_{S_\theta}^{d,m}}$$

denotes a correlation between the plurality of first estimation indices and the plurality of second estimation indices, $A_H^{d,m}$ denotes one of the plurality of first estimation indices, and $A_{S_\theta}^{d,m}$ denotes one of the plurality of second estimation indices.

Regarding the setting space and the candidates, an example is described as follows: the plurality of settings include P and Q, where P has p types of setting values, and Q has q types of setting values. Therefore, the setting space formed by P and Q will include (p×q) elements, each element corresponds to a setting value of P and a setting value of Q, and the candidate is one of these (p×q) elements.

In an embodiment, the number of datasets |D| is at least one, and the number of neural network models |M| is at least one.

In an embodiment, $$\rho_{A_H^{d,m} A_{S_\theta}^{d,m}}$$

is Pearson correlation coefficient. This coefficient is calculated according to the average $A_H^{d,m}$ of the estimation indices of the in-memory computing device H in each class and the average $A_{S_\theta}^{d,m}$ of the estimation indices of the simulator $S_\theta$ in each class. The estimation index adopted here is accuracy, which can be calculated from the diagonal of the confusion matrix. The calculation of the Pearson correlation coefficient in shown as Equation 2 below, in which the superscripts used to indicate the dataset d and the model m are omitted for equation conciseness.

$$\rho_{A_H, A_{S_\theta}} = \frac{\sum_{c=1}^{|C|}(a_H^c - \bar{A}_H)(a_{S_\theta}^c - \bar{A}_{S_\theta})}{\sqrt{\sum_{c=1}^{|C|}(a_H^c - \bar{A}_H)^2}\sqrt{\sum_{c=1}^{|C|}(a_{S_\theta}^c - \bar{A}_{S_\theta})^2}},$$ (Equation 2)

where |C| denotes a number of the plurality of classes of each of the plurality of datasets, $a_H^c$ denotes the estimation index of the c-th class of the in-memory computing device H in |C| classes, $a_{S_\theta}^c$ denotes the estimation index of the c-th class of the simulator $S_\theta$ set with the candidate θ in |C| classes, $\bar{A}_H$ denotes the average of the estimation indices of the in-memory computing device H in |C| classes, and $\bar{A}_{S_\theta}$ denotes the average of the estimation indices of the simulator $S_\theta$ set with the candidate θ in |C| classes.

In an embodiment, the calculation method of the average $\bar{A}$ of the hardware H or the simulator $S_\theta$ in the multiple estimation indices $a^c$ is shown in the following Equation 3.

$$\bar{A} = \frac{1}{|C|}\sum\nolimits_{c=1}^{|C|} a^c.$$ (Equation 3)

In step 40, the processing device performs an optimization algorithm to search an optimal parameter in a setting space constructed by the plurality of settings so that the correlation sum is maximal. In an embodiment, the optimization algorithm is one of the simulated annealing and the genetic algorithm. However, the optimization algorithm is not limited to the above examples, and any algorithm for calculating an optimal vector in a high-dimensional vector space should be regarded as an embodiment of the optimization algorithm described in the present disclosure.

Figure 1B:
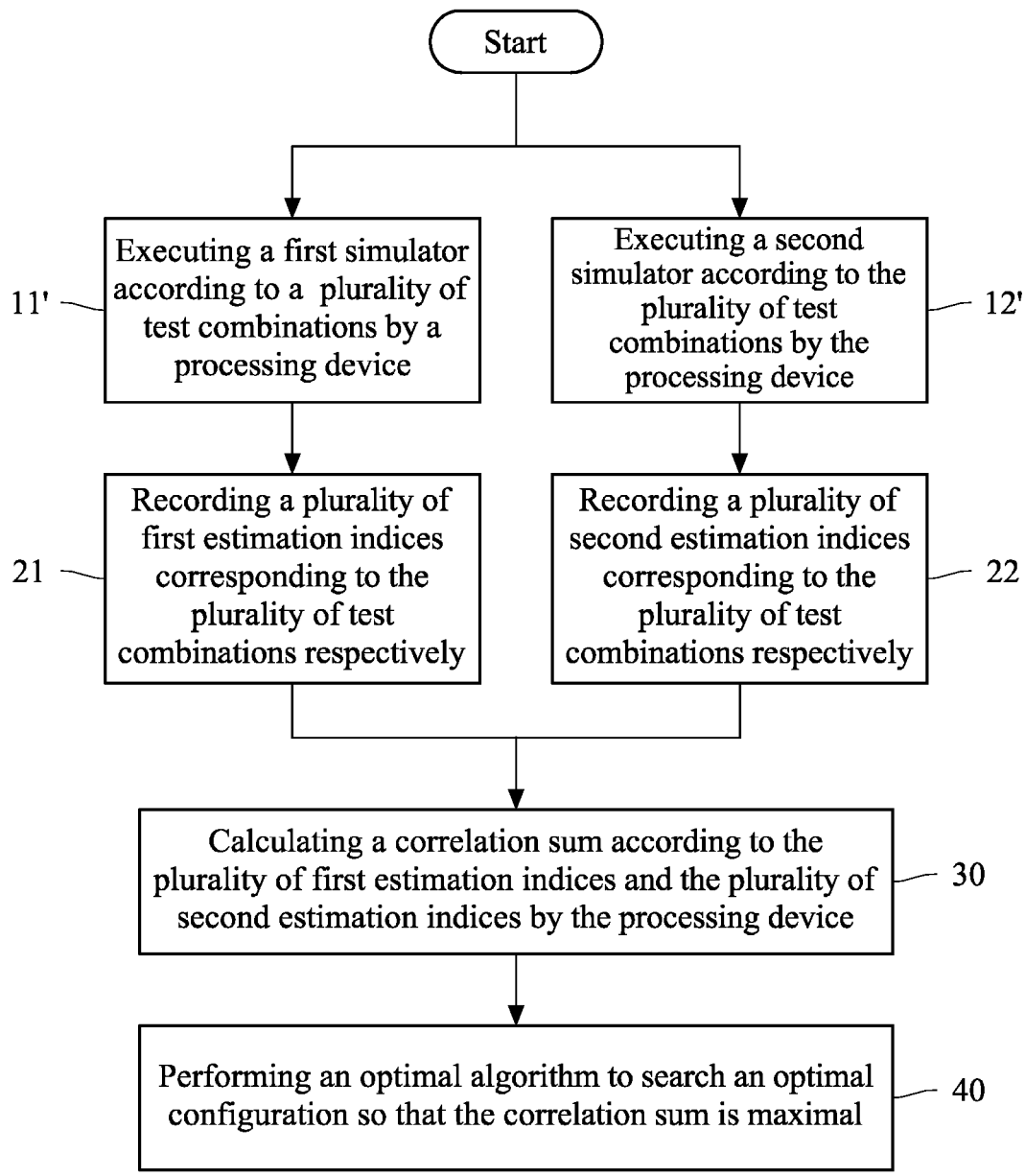
FIG. 1B is a flowchart of a setting method of in-memory computing simulator according to another embodiment of the present disclosure.

FIG. 1B is a flowchart of a setting method of in-memory computing simulator according to another embodiment of the present disclosure and includes steps 11' to 40. The embodiment of FIG. 1B is used to realize the second object of the present disclosure: simulating another kinds of IMC simulator with the IMC simulator. FIG. 1B differs from FIG. 1A in only two steps, and the following describes these two steps.

In step 11' the processing device executes a first simulator according to a plurality of test combinations. The first simulator is the simulation target, equivalent to the in-memory computing device in the embodiment of FIG. 1A. The first simulator may adopt one of the followings: NeuroSIM, aihwkit, and MemTorch, and has an unknown and fixed setting. Therefore, both steps 11 and 11' basically have same operations, except that the execution subject is changed from the in-memory computing device to the simulator.

In step S12', the processing device executes the second simulator according the plurality of test combinations. The second simulator is equivalent to the simulator described in the embodiment of FIG. 1B. The second simulator may adopt one of the followings: NeuroSIM, aihwkit, and MemTorch, and has an unknown and fixed setting.

Overall, the setting method of in-memory computing simulator proposed in an embodiment of the present disclosure formulates the hardware-simulator matching problem into an optimization problem, as shown in the following Equation 4.

$$\theta^* = \arg\max_\theta F(H, S_\theta),$$ (Equation 4)

where denotes the optimal parameter searched by the optimal algorithm, F denotes the objective function to measure the correlation of the input-output behaviors between an in-memory computing device H and a given simulator $S_\theta$ set with the candidate θ. The embodiment of the objective function F has been described in detail above. In other embodiments, F(H, $S_\theta$) may also adopt any distance function or loss function that reflects the output difference between the in-memory computing device H and the simulator $S_\theta$ set with the candidate with the candidate θ, such as one of the L1 loss function, L2 loss function, cosine similarity, and Euclidean distance.

For verifying the setting method of in-memory computing simulator proposed in the present disclosure, we conduct three different experiments with three open-source IMC simulators: NeuroSIM, aihwkit, and MemTorch, two common image classification datasets: CIFAR-10 and EMNIST Letters, and two neural network models: VGG8 and VGG13 to shows the effectiveness of the proposed method, namely, the present disclosure may truly obtains a best settings to simulate an unknown IMC hardware or even another IMC simulator with an unknown setting. In addition, the experiments adopt the setting of a single parameter (parameter that has the greatest impact on the output) in order to visualize the landscape of the objective function proposed by the present disclosure.

Experiment 1: An Intra-Simulator Experiment

Figure 2:
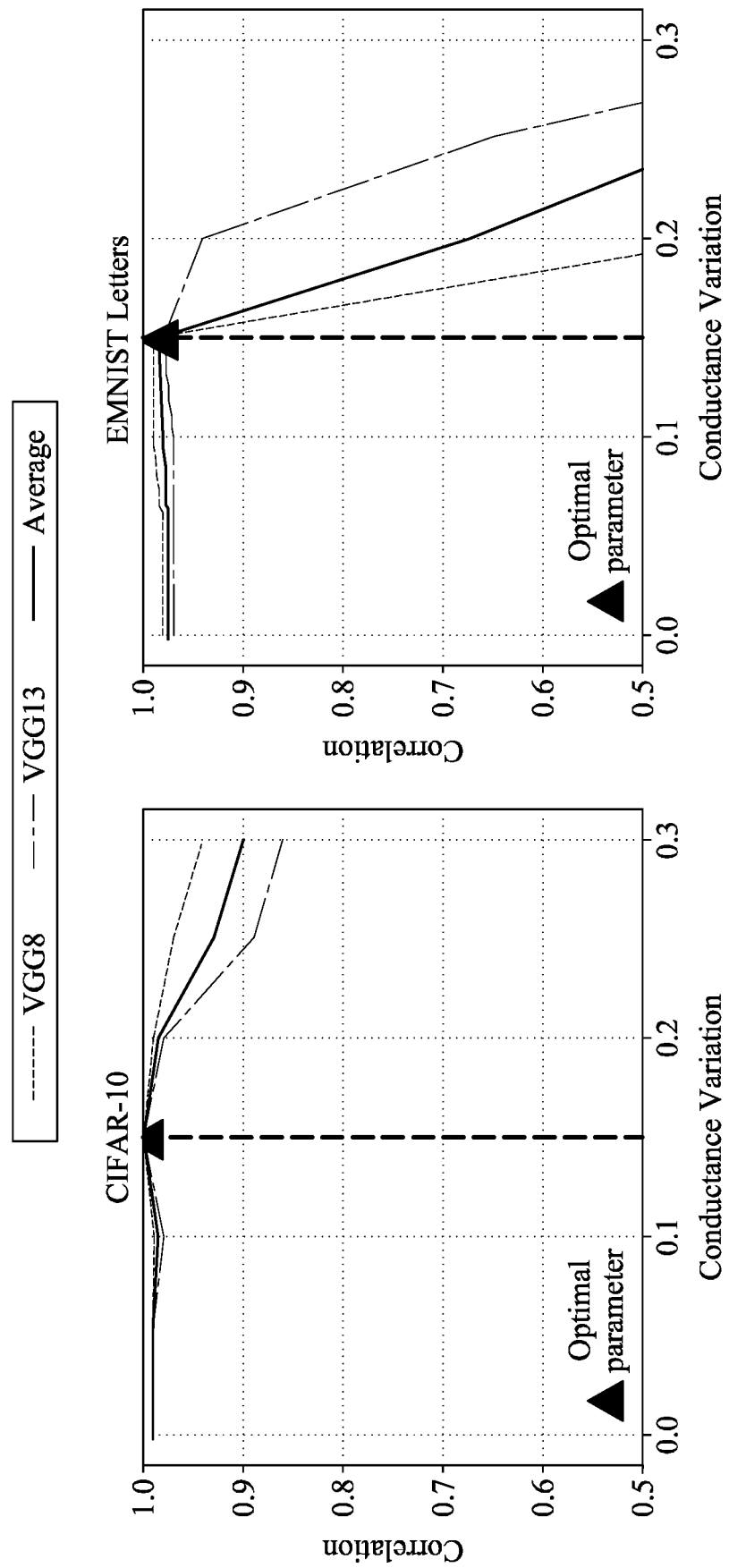
FIG. 2 to FIG. 11 are experimental diagrams of the setting method of in-memory computing simulator according to an embodiment of the present disclosure.
Figure 3:
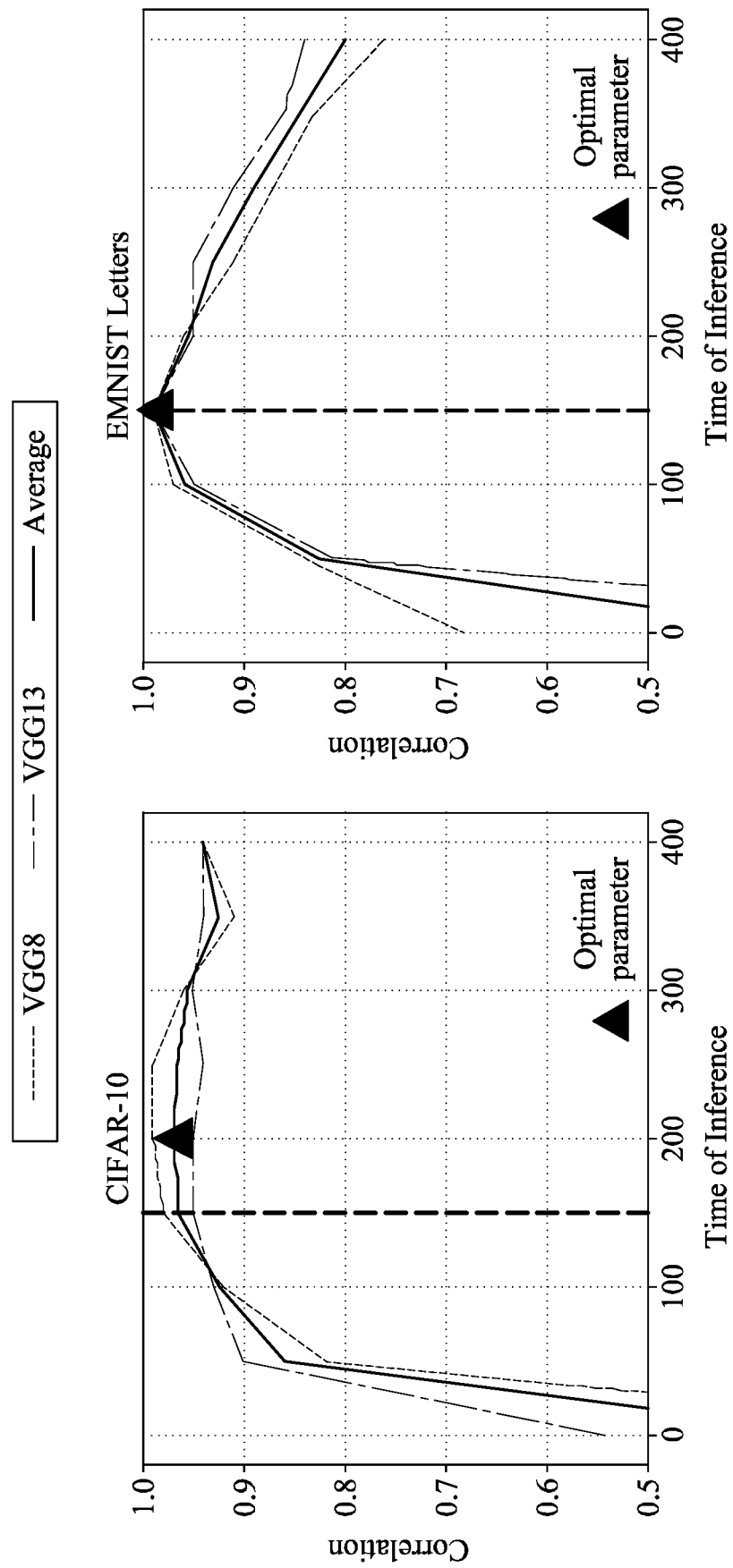

In Experiment 1, the simulator with preset settings is used as the in-memory computing device (hereinafter referred to as hardware). Then, the method proposed by an embodiment of the present disclosure is applied to change the settings of another simulator (using the same simulator as the in-memory computing device). FIG. 2 is the experimental result on NeuroSim, where the horizontal axis denotes the conductance variation. FIG. 3 shows the experimental results on aihwkit, where the horizontal axis denotes the inference time. The vertical axes in FIG. 2 and FIG. 3 both denote correlation coefficients. The higher the value is, the higher the matching degree between the hardware and the simulator. In FIG. 2 and FIG. 3, the landscape of VGG8, VGG13 and the average of the above two may be observed, and the symbol ▲ in FIG. 2 and FIG. 3 denotes the optimal parameter θ* found by applying the method of the present disclosure. In the experiment of FIG. 2, the optimal parameter found by the method of the present disclosure is θ*=0.15. In the experiment of FIG. 3, the optimal parameter found by applying the method of the present disclosure is θ*=150. The dashed lines in FIG. 2 and FIG. 3 denote the maximum value of the experimental mean line of the dataset obtained by averaging the two solid lines (mean line) of the left and right figures (experiments of different datasets).

It can be observed from FIG. 2 and FIG. 3 that the correlation coefficient corresponding to the optimal parameter θ* is completely equal to the maximum value, which shows the effectiveness of the present disclosure. In addition, it can be observed that the landscape is smooth, and there are no violent fluctuations or continuous fluctuations as a whole. This means that the maximum denoted by the symbol ▲ has a higher chance of being a global maximum rather than a local maximum for a particular dataset.

Experiment 2: Inter-simulator Experiment

Figure 4:
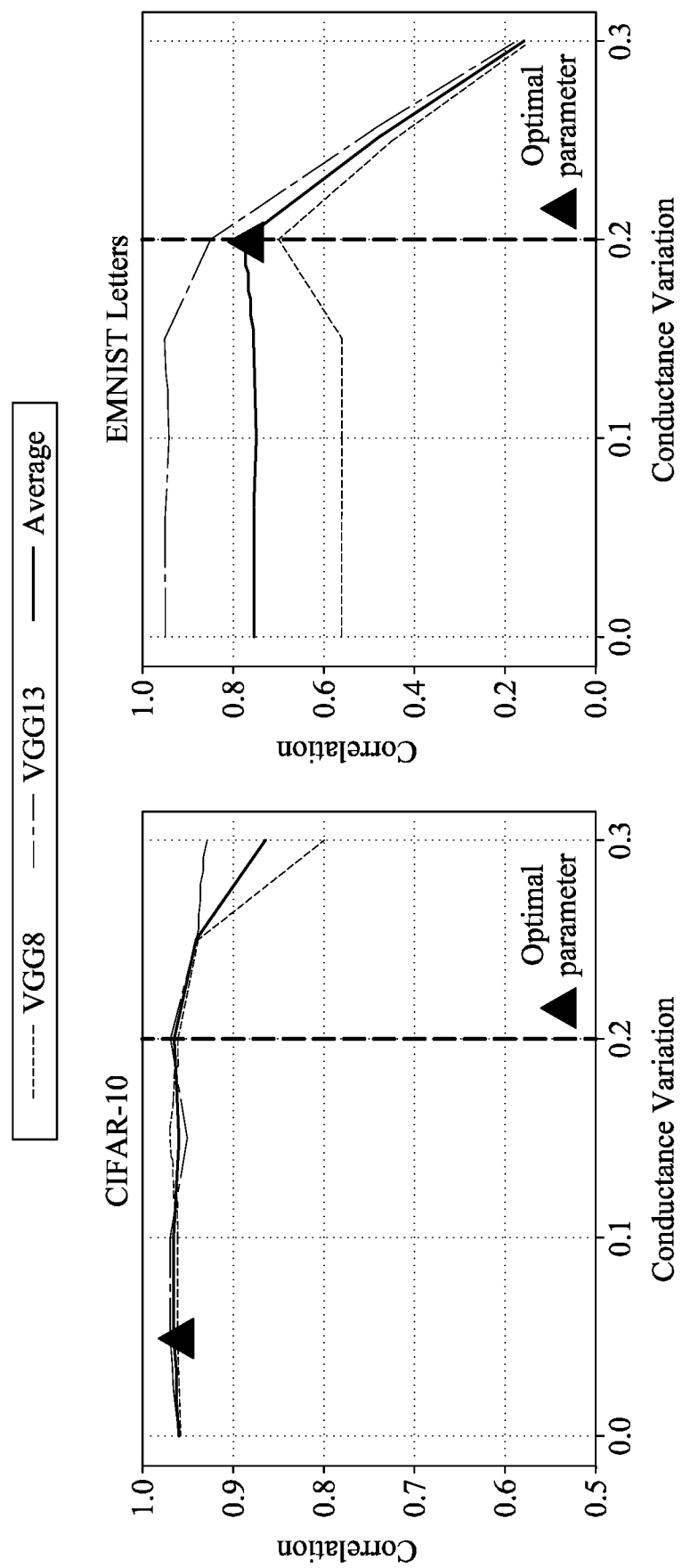
Figure 5:
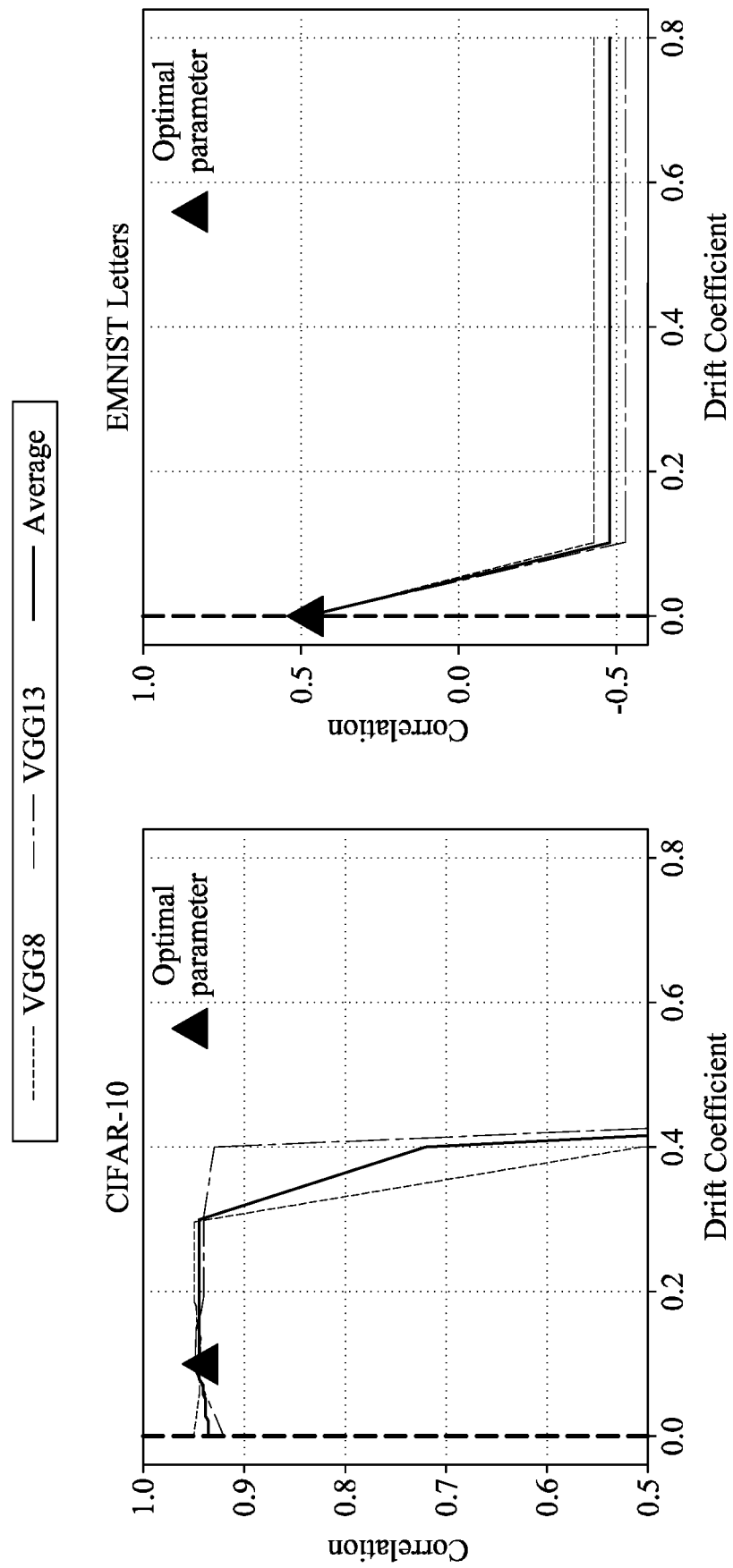
Figure 6:
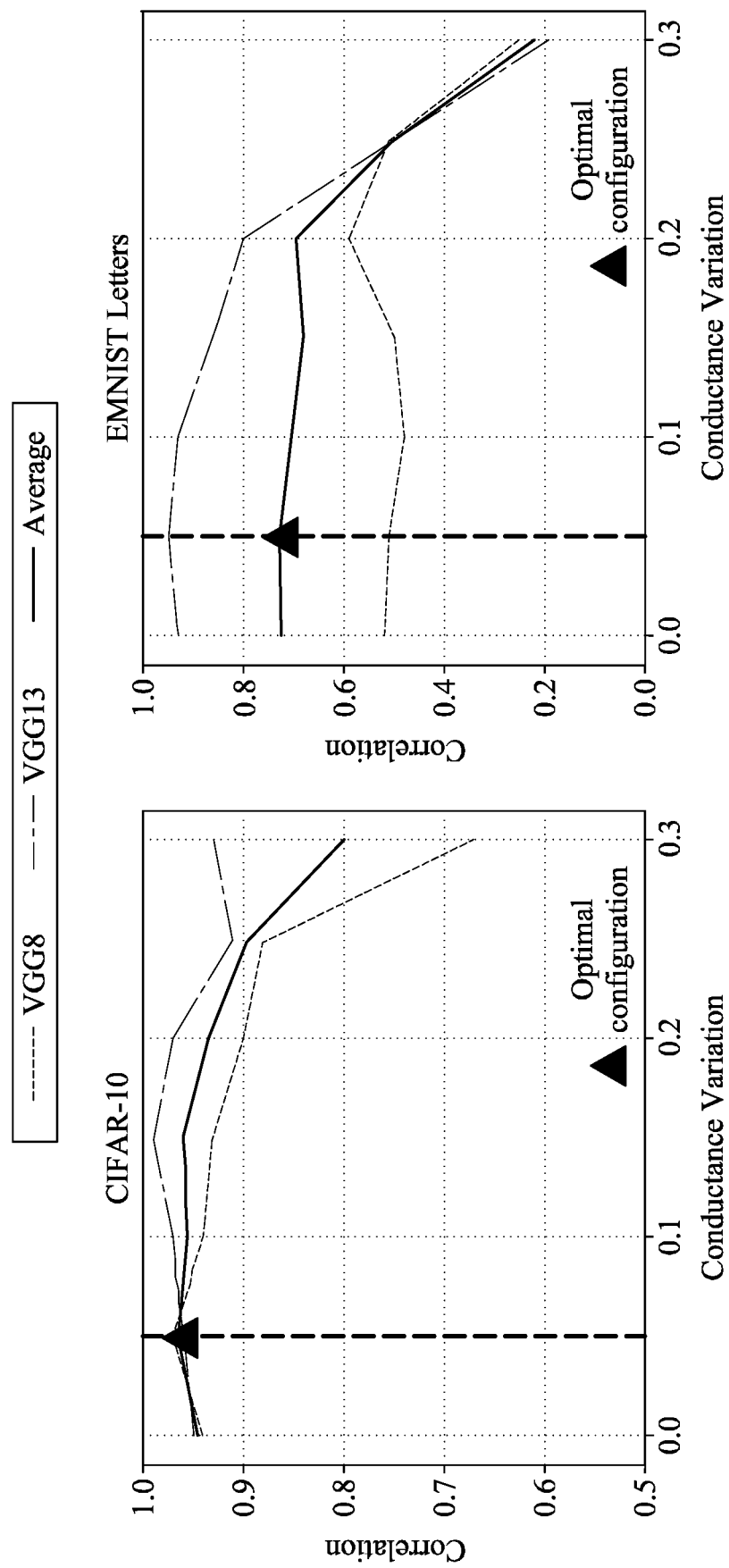
Figure 7:
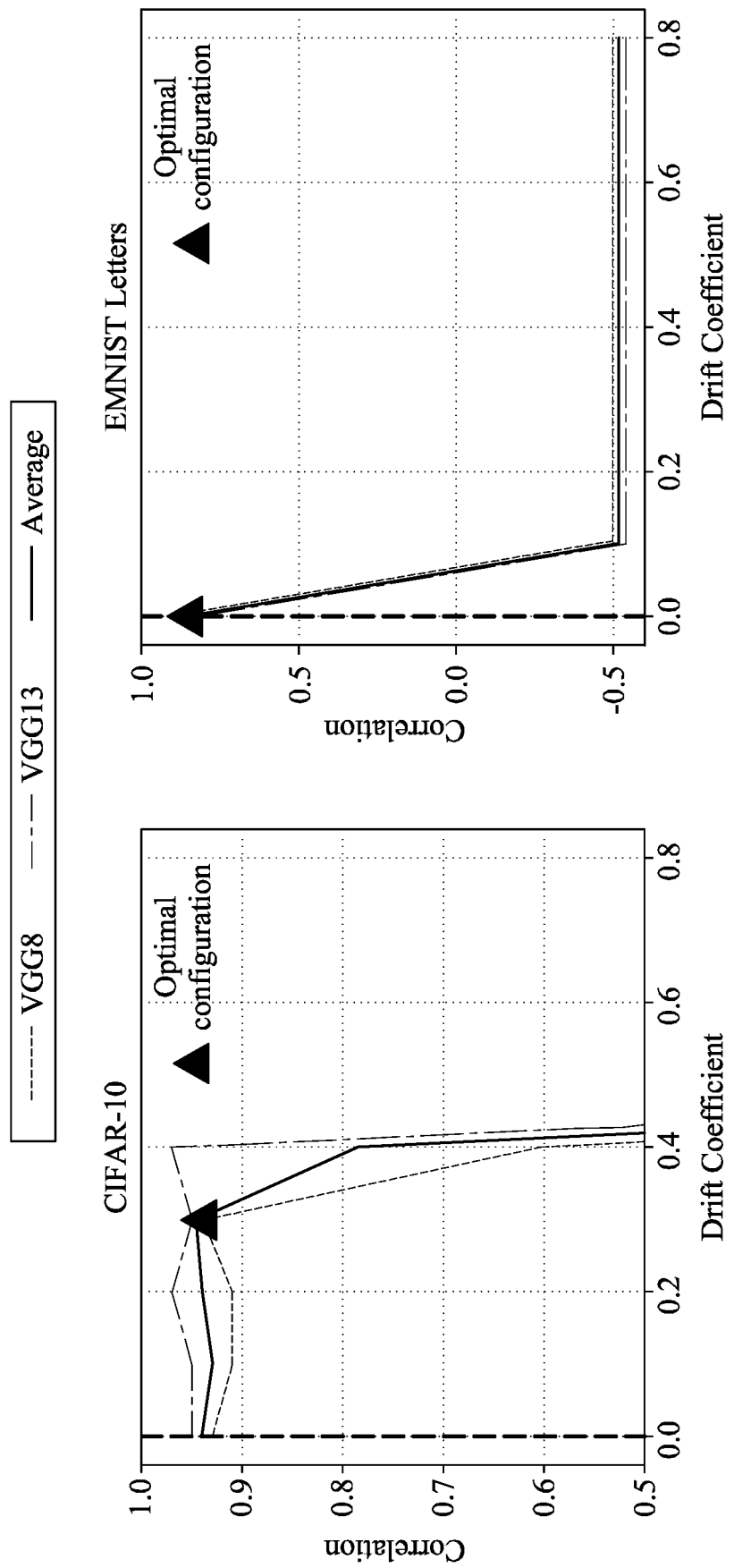
Figure 8:
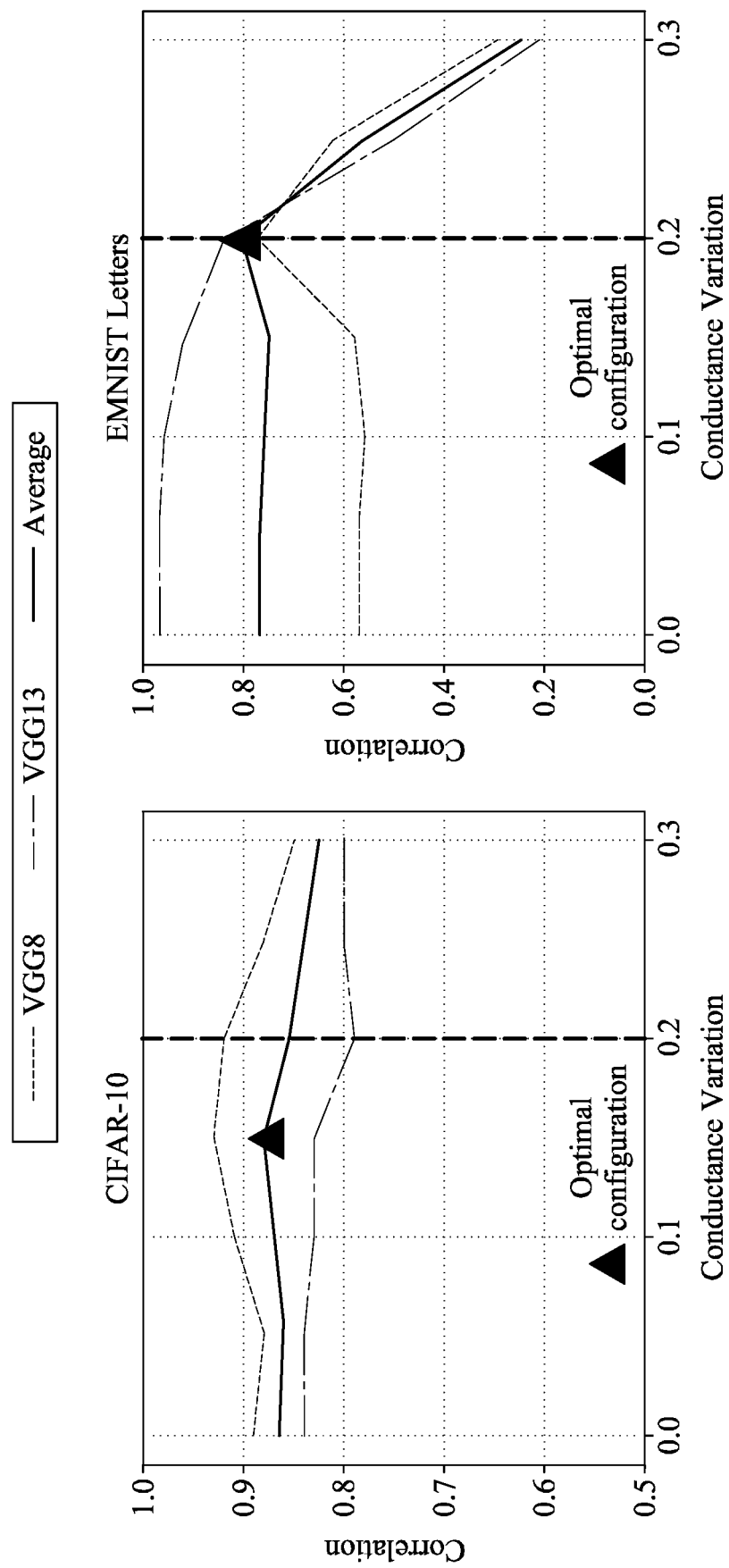
Figure 9:
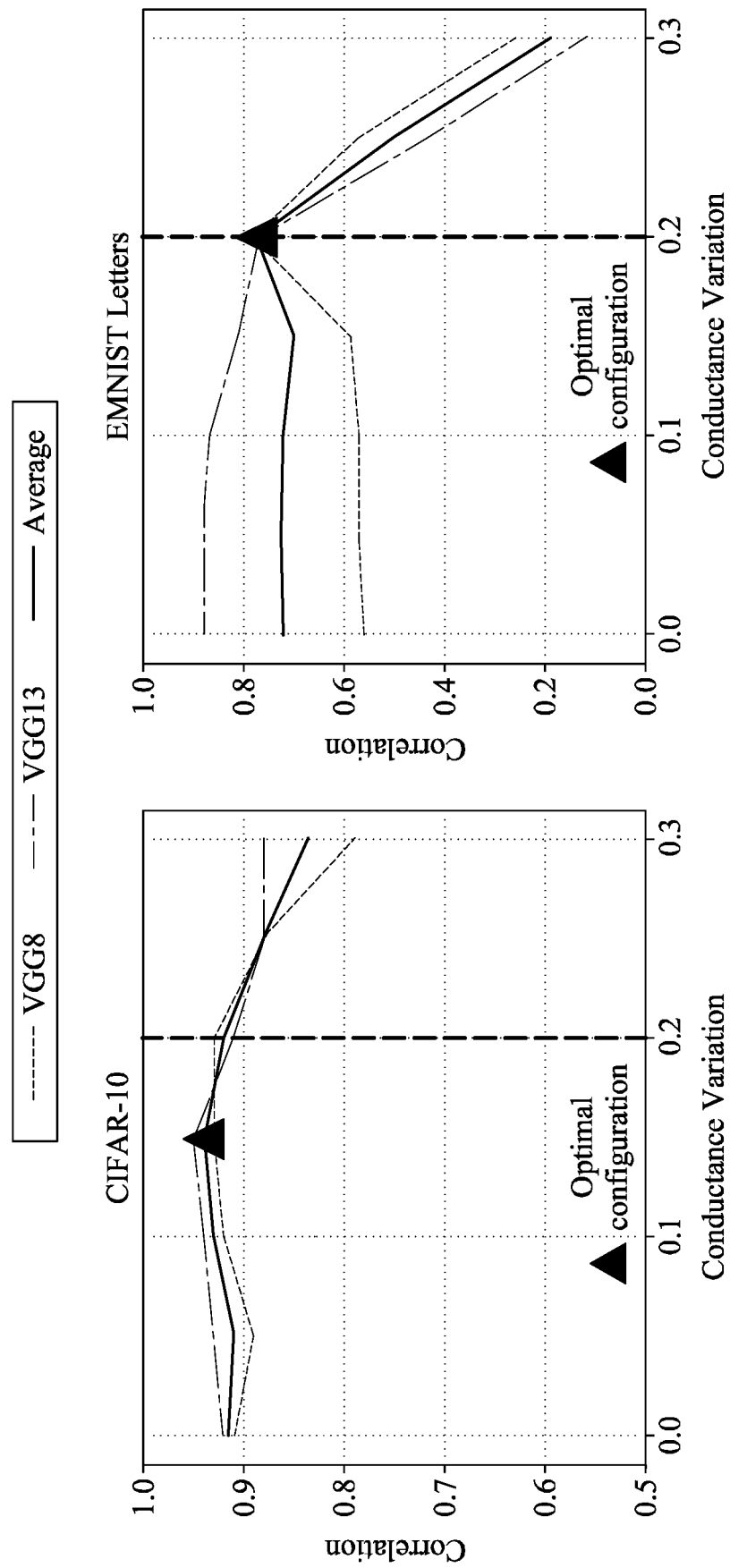
Figure 10:
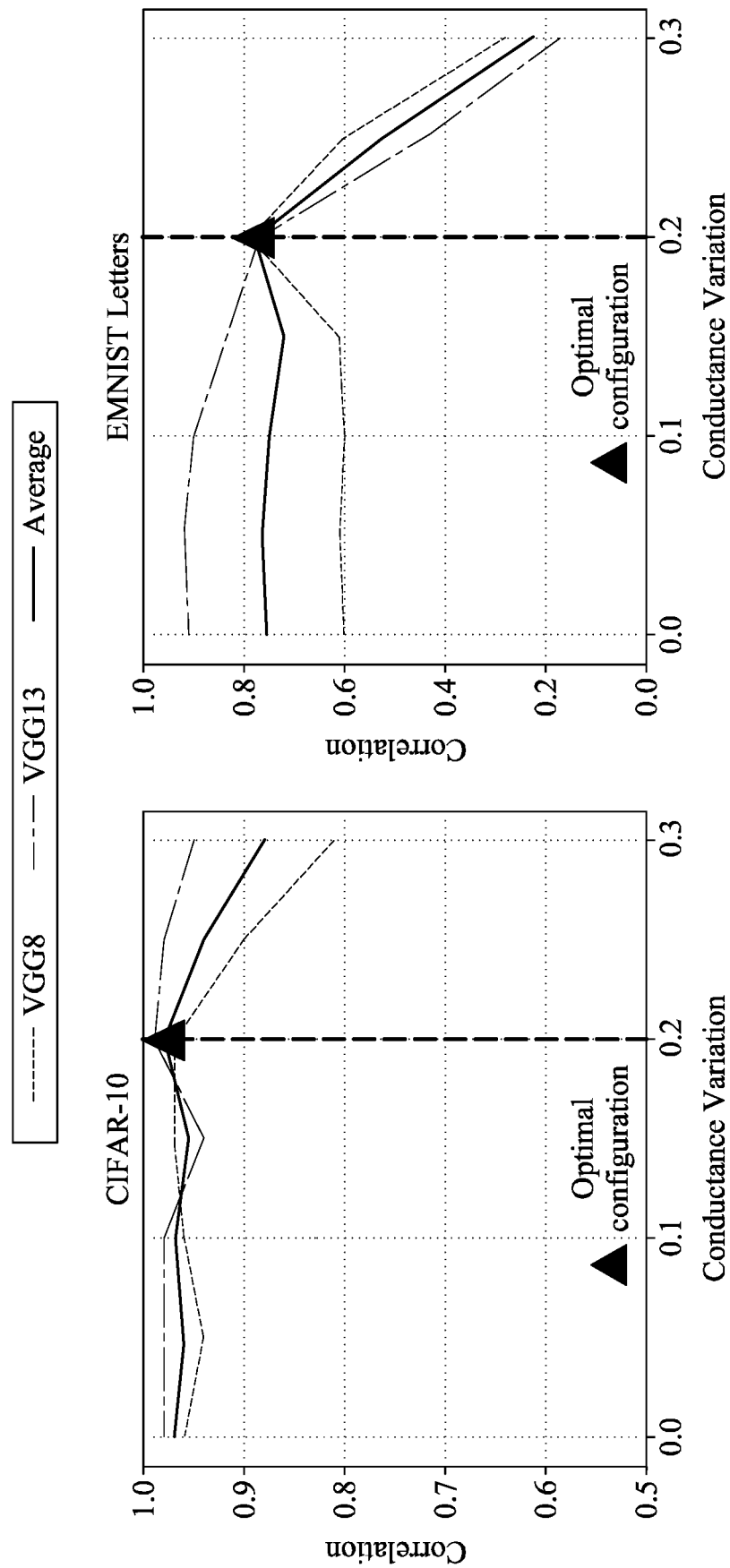
Figure 11:
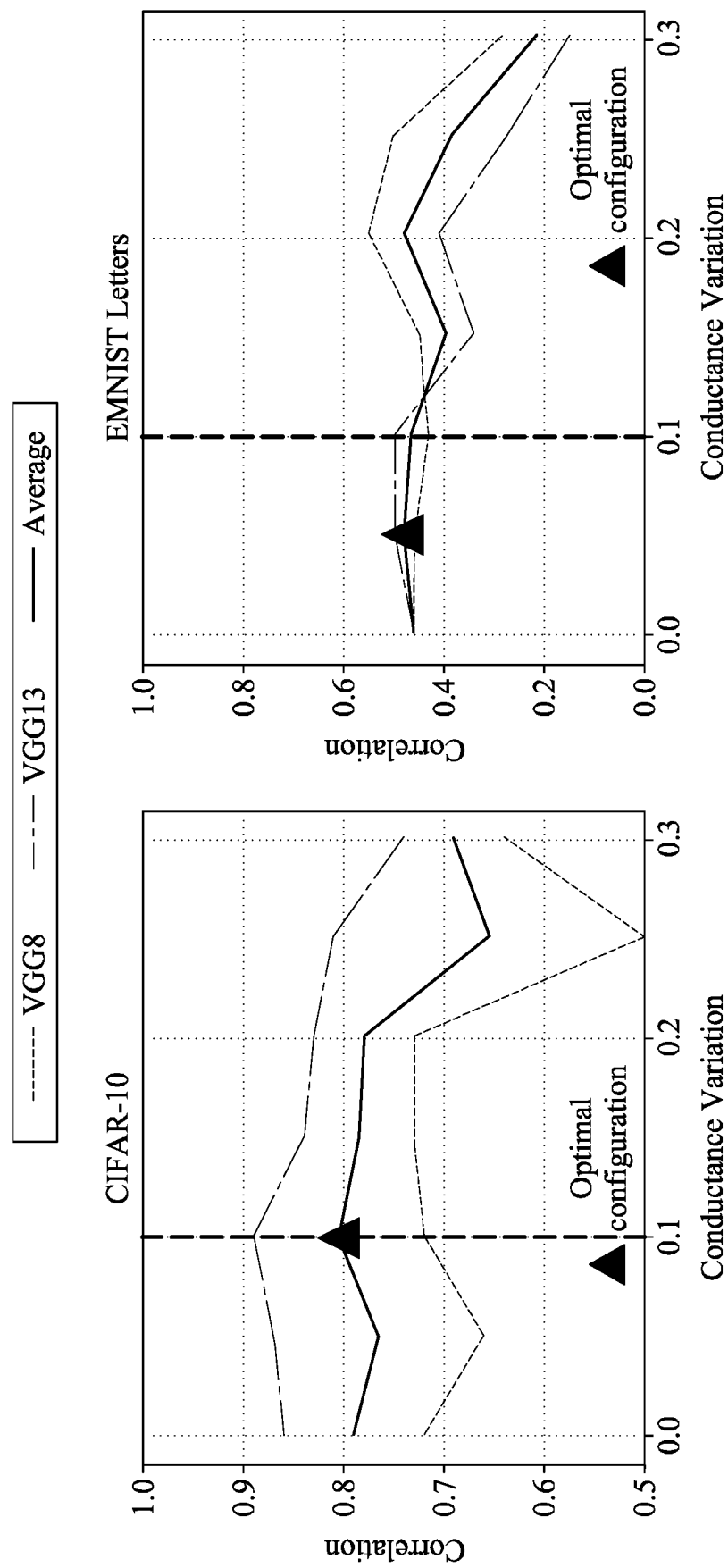

In Experiment 2, three different simulators, NeuroSIM, MemTorch and aihwkit are used to further test the method proposed by the present disclosure. One simulator represents the hardware H with the unknown setting, and the other one represents the simulator $S_\theta$ with the setting θ. For the NeuroSim, MemTorch, and aihwkit simulators, we select Conductance Variation, Drift Coefficient, and Time of Inference as the target settings, respectively. FIGS. 4 and 5 are experimental diagrams of using NeuroSim for the hardware and MemTorch for the simulator. FIG. 6 and FIG. 7 are the experimental diagrams of simulating aihwkit with NeuroSim and MemTorch, respectively.

It should be noted that the settings of the three simulators are different from each other so there is no ground truth for Experiment 2 to refer to. However, the method proposed by the present disclosure can still search for the optimal parameter θ* from the landscape as shown in FIG. 4 to FIG. 7.

Experiment 3: Hardware-Simulator Experiment

In Experiment 3, we adopt four default configurations of aihwkit, aihwkit-GoKm (GokmenVlasovPreset), aihwkit-Tiki (TikiTakaEcRamPreset), aihwkit-Mixand (MixedPrecisionEcRamPreset) and aihwkit-Ideal (Idealized4Preset) as the hardware. These four configuration are provided by IBM® based on real hardware devices it produces. Also, we select NeuroSim as the simulator. FIG. 8 to FIG. 11 show the experimental results of aihwkit-GoKm, aihwkit-Tiki, aihwkit-Mix and aihwkit-Ideal respectively, and the simulator adopts NeuroSim. Overall, the proposed objective function constructs a smooth landscape to the input-output behavior of the hardware, which shows the potential of the proposed method to solve the hardware-simulator matching problem for real IMC technologies.

In view of the above, the present disclosure aims to simulate a random IMC hardware or IMC simulators with an existing simulator to prevent generating a new simulator from scratch that can significantly reduce development/production costs, such as time. By assuming the existence of the best parameter setting for a given simulator that matches the hardware behavior, the present disclosure converts the hardware-simulator matching problem into an optimization problem that searches for the optimal setting in the setting space. The present disclosure designs an objective function based on calculating the Pearson correlation coefficient of the per-class testing accuracy between a target hardware and a simulator with the setting. The experimental results show the landscape of the setting space constructed by the proposed objective function is smooth, which shows the potential of the proposed method that can be solved by existing optimization algorithms.

What is claimed is:
1. A setting method of in-memory computing simulator comprising:
performing, by an in-memory computing device, a plurality of test combinations and recording a plurality of first estimation indices corresponding to the plurality of test combinations respectively,
wherein each of the plurality of test combinations comprises one of a plurality of neural network models and one of a plurality of datasets;
executing, by a processing device a simulator according to the plurality of test combinations, and recording, by the processing device,
a plurality of second estimation indices corresponding to the plurality of test combinations respectively, wherein the simulator has a plurality of settings that are adjustable;
calculating, by the processing device, a correlation sum according to the plurality of first estimation indices and the plurality of second estimation indices, wherein the correlation sum is a sum of a plurality of correlations, and each of the plurality of correlations is one of Pearson correlation coefficient, L1 loss function, L2 loss function, and Euclidean distance; and
performing, by the processing device, an optimal algorithm to search an optimal parameter in a setting space constructed by the plurality of settings so that the correlation sum is maximal, wherein calculating the correlation sum according to the plurality of first estimation indices and the plurality of second estimation indices is performed according to an equation:

$$F(H, S_\theta) = \sum_{d=1}^{|D|} \sum_{m=1}^{|M|} \rho_{A_H^{d,m} A_{S_\theta}^{d,m}},$$

wherein:
$F(H, S_\theta)$ denotes the correlation sum,
H denotes the in-memory computing device,
S denotes the simulator,
θ denotes a candidate of the setting space constructed by the plurality of settings,
$S_\theta$ denotes the simulator set with the candidate,
|D| denotes a number of the plurality of datasets,
|M| denotes a number of the plurality of neural network models, $$\rho_{A_H^{d,m} A_{S_\theta}^{d,m}}$$

denotes correlation between the plurality of first estimation indices and the plurality of second estimation indices,
$A_H^{d,m}$ denotes one of the plurality of first estimation indices, and
$A_{S_\theta}^{d,m}$ denotes one of the plurality of second estimation indices.

2. The setting method of in-memory computing simulator of claim 1, wherein the correlation is calculated according to another equation:

$$\rho_{A_H, A_{S_\theta}} = \frac{\sum_{c=1}^{|C|} (a_H^c - \overline{A}_H)(a_{S_\theta}^c - \overline{A}_{S_\theta})}{\sqrt{\sum_{c=1}^{|C|} (a_H^c - \overline{A}_H)^2} \sqrt{\sum_{c=1}^{|C|} (a_{S_\theta}^c - \overline{A}_{S_\theta})^2}}, \text{ wherein:}$$

|C| denotes a number of a plurality of classes of each of the plurality of datasets,
$a_H^c$ denotes an estimation index of the c-th class of the in-memory computing device in the plurality of classes,
$a_{S_\theta}^c$ denotes an estimation index of the c-th class of the simulator set with the candidate in the plurality of classes,
$\overline{A}_H$ denotes an average of the estimation indices of the in-memory computing device in the plurality of classes, and
$\overline{A}_{S_\theta}$ denotes an average of the estimation indices of the simulator set with the candidate in the plurality of classes.

3. The setting method of in-memory computing simulator of claim 1, wherein the optimal algorithm is one of a simulated annealing or a genetic algorithm.

4. The setting method of in-memory computing simulator of claim 1, wherein each the plurality of first estimation indices and the plurality of second estimation indices is one of accuracy, precision, recall, and F1-score.

5. The setting method of in-memory computing simulator of claim 1, wherein the plurality of neural network models is VGG8 and VGG13.

6. The setting method of in-memory computing simulator of claim 1, wherein the plurality of datasets is CIFAR-10 and EMNIST.

7. The setting method of in-memory computing simulator of claim 1, wherein the simulator is one of NeuroSIM, aihwkit, and Mem Torch.

8. A setting method of in-memory computing simulator comprising a plurality of steps performed by a processor device, wherein the plurality of steps comprises:
executing a first simulator according to a plurality of test combinations and recording a plurality of first estimation indices corresponding to the plurality of test combinations respectively,
wherein each of the plurality of test combinations comprises one of a plurality of neural network models and one of a plurality of datasets;
executing a second simulator according to the plurality of test combinations and recording a plurality of second estimation indices corresponding to the plurality of test combinations respectively, wherein the second simulator has a plurality of settings that are adjustable;
calculating a correlation sum according to the plurality of first estimation indices and the plurality of second estimation indices, wherein the correlation sum is a sum of a plurality of correlations, and each of the plurality of correlations is one of Pearson correlation coefficient, L1 loss function, L2 loss function, and Euclidean distance; and
performing an optimal algorithm to search an optimal parameter in a setting space constructed by the plurality of settings so that the correlation sum is maximal, wherein calculating the correlation sum according to the plurality of first estimation indices and the plurality of second estimation indices is performed according to an equation:

$$F(H, S_\theta) = \sum_{d=1}^{|D|} \sum_{m=1}^{|M|} \rho_{A_H^{d,m} A_{S_\theta}^{d,m}},$$

wherein:
$F(H, S_\theta)$ denotes the correlation sum,
H denotes the in-memory computing device,
S denotes the simulator,
θ denotes a candidate of the setting space constructed by the plurality of settings,
$S_\theta$ denotes the simulator set with the candidate,
|D| denotes a number of the plurality of datasets,
|M| denotes a number of the plurality of neural network models, $$\rho_{A_H^{d,m} A_{S_\theta}^{d,m}}$$

denotes a correlation between the plurality of first estimation indices and the plurality of second estimation indices,
$A_H^{d,m}$ denotes one of the plurality of first estimation indices, and
$A_{S_\theta}^{d,m}$ denotes one of the plurality of second estimation indices.

\* \* \* \* \*